April 30, 1963    F. G. KRAFFT    3,087,286
FEEDING METHOD AND APPARATUS
Filed Feb. 2, 1961    2 Sheets-Sheet 1
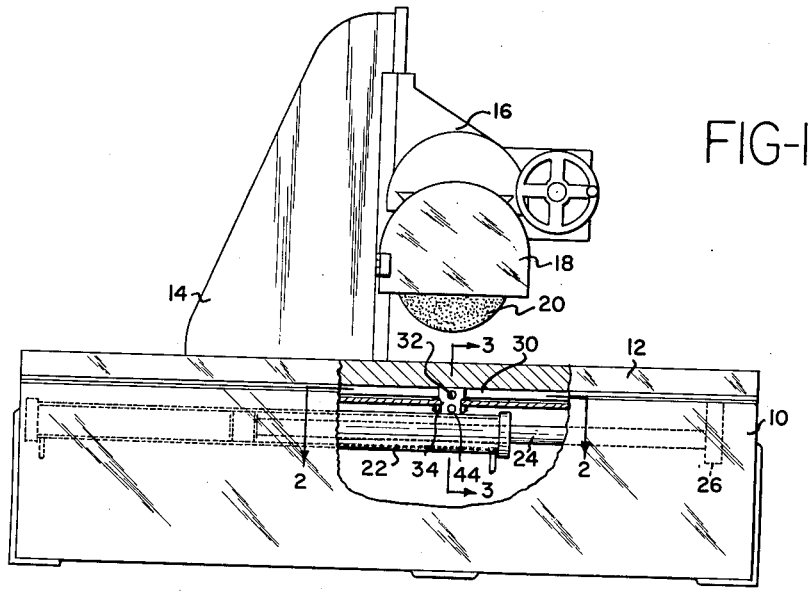
FIG-1
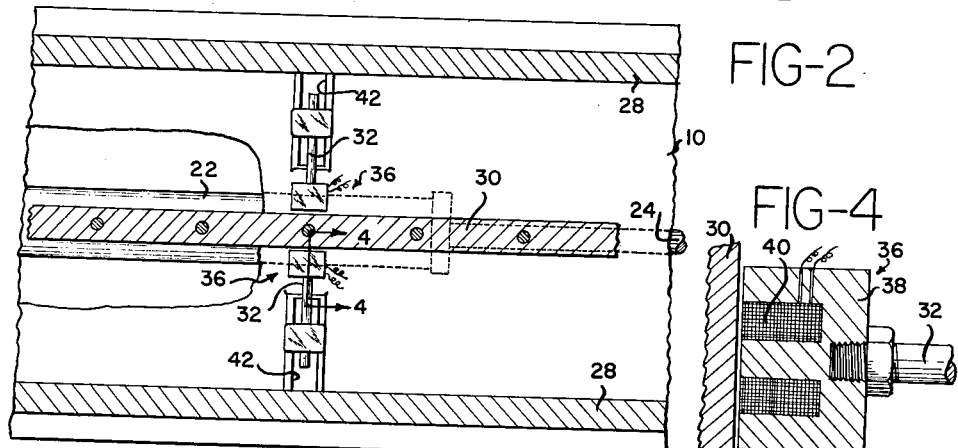
FIG-2
FIG-4
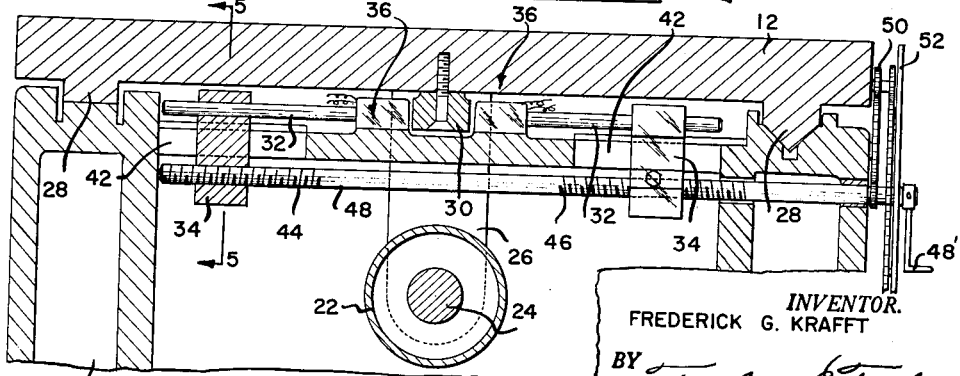
FIG-3
INVENTOR.
FREDERICK G. KRAFFT
BY
ATTORNEYS April 30, 1963 F. G. KRAFFT 3,087,286
FEEDING METHOD AND APPARATUS
Filed Feb. 2, 1961 2 Sheets-Sheet 2
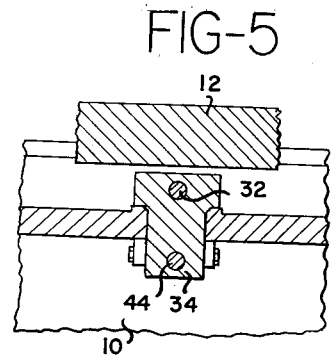
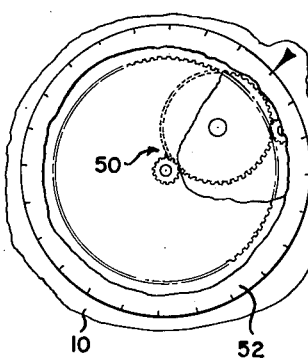
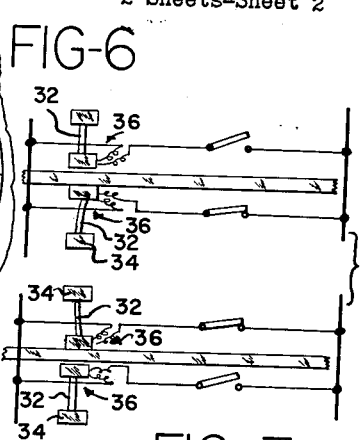
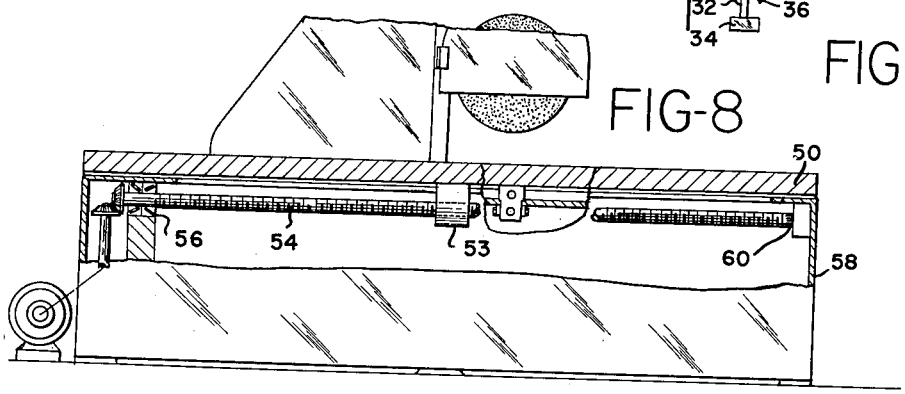
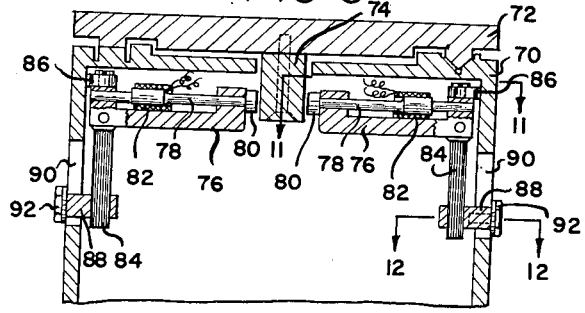
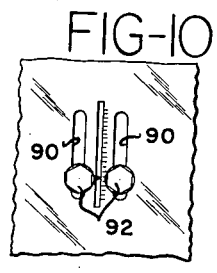
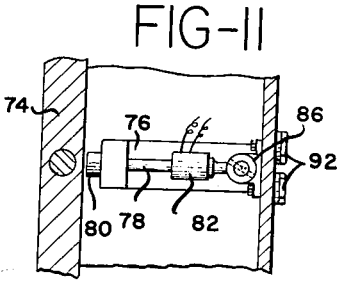
INVENTOR.
FREDERICK G. KRAFFT
BY
ATTORNEYS

United States Patent Office 3,087,286
Patented Apr. 30, 1963

3,087,286
FEEDING METHOD AND APPARATUS
Frederick G. Krafft, Springfield, Ohio, assignor to The Thompson Grinder Company, Springfield, Ohio, a corporation of Ohio
Filed Feb. 2, 1961, Ser. No. 86,679
13 Claims. (Cl. 51—165)

This invention relates to feed control arrangements and to methods of controlling feeding movements, particularly, of reciprocable members, as in connection with such a member in a machine tool.

In connection with machine tools, the accurate feeding and control of the relatively movable members is always somewhat of a problem and this is particularly the case where extremely fine feed control is desirable. This is especially the case in connection with grinding machines because grinding machines are called upon to produce much more finely dimensioned workpieces than other machine tools, such as lathes and the like.

Devices have been proposed for accomplishing the relatively fine feeding of relatively movable members of a grinding machine or the like, and one of the known devices employs the principle of magnetostrictive action on, for example, a nickel rod. Still another known device accomplishes fine feeding movements by the heating and cooling of a control element such as a feed screw. The first mentioned device is relatively expensive and the arrangement for heating and cooling a control element is elaborate and also relatively expensive and extremely difficult to control with the degree of accuracy desired. The degree of accuracy referred to, incidentally, is on the order to .000010 inch or slightly more or less.

Having the foregoing in mind, it is a primary object of the present invention to provide a relatively simple, inexpensive, and highly reliable control arrangement for controlling feed movements so as to obtain feed increments the order of about 1/100,000 of an inch.

A still further object of this invention is the provision of a method of controlling the feeding of a work member or the like such that feed increments of very small amounts can be obtained.

A still further object of this invention is the provision of a method and apparatus for controlling feed in order to obtain fine increments of feed in which the increments can be varied and accurately controlled.

Still another object of this invention is the provision of a feed arrangement in which the feed can be controlled in relatively fine increments which can readily be incorporated in new manufacture and can, in certain cases, be incorporated in existing manufacture.

In general, the objectives of this invention are obtained by biasing the moveable member which it is desired to control in the direction which it is to move, and holding the moveable member in a desired position by clamping members that can be selectively engaged with or released from the moving member. These clamping members are supported so that the biasing force on the work member will cause the clamping members to deflect, thus permitting a feed movement of the desired amount.

The clamping members are arranged in pairs so that by alternately engaging and disengaging the clamping members from the moveable member, the moving member can be caused to advance in the desired direction by an intermittent feed in which each increment of feed is an accurate predetermined minute increment whereby highly accurate machining results, particularly in connection with a grinding operation, can be accomplished.

The several objectives referred to above as well as still other objects and advantages of this invention will be more apparent upon reference to the following specification taken in connection with the accompanying drawings wherein:

FIGURE 1 is a more or less diagrammatic representation of a grinding machine having a feeding device according to the present invention;

FIGURE 2 is a plan sectional view indicated generally by line 2—2 on FIGURE 1;

FIGURE 3 is a transverse cross-section of the FIGURE 1 arrangement and is indicated by line 3—3 on FIGURE 1;

FIGURE 4 is a sectional view indicated by line 4—4 on FIGURE 2 showing the construction of an electromagnetic element forming part of one of the clamp devices;

FIGURE 5 is a sectional view indicated by line 5—5 on FIGURE 3 showing a slide block forming an adjustable part of the clamping device or the feed control device of the present invention;

FIGURE 6 is a more or less diagrammatic representation showing a dial that could be employed to indicate the adjustment of the clamping members thereby indicating the size of the feed increment;

FIGURE 7 is a more or less diagrammatic view showing two stages during the control of the feed of a movable member by the device of the present invention;

FIGURE 8 is a view similar to FIGURE 1 but showing how the moveable member could be actuated by a feed screw instead of a hydraulic motor;

FIGURE 9 is a view similar to FIGURE 3 but shows a somewhat modified arrangement wherein the clamping members are arranged to have the deflection thereof controlled by adjustable torque bars;

FIGURE 10 is a view showing the manner in which the yieldability of the torque bars could be adjusted from externally of the bed of the machine;

FIGURE 11 is a plan section indicated by line 11—11 on FIGURE 9; and

FIGURE 12 is a plan section indicated by line 12—12 on FIGURE 9.

Referring to the drawings somewhat more in detail, the arrangement shown in FIGURE 1 consists of a more or less conventional grinding machine in which there is a bed 10 on which there reciprocably mounted a table or slide 12. The table 12 comprises the moveable member in this particular instance but it will be understood, as the description of this invention progresses, that the invention is useful for controlling other moveable members or, in fact, other parts of the machine shown in FIGURE 1.

Adjacent to attached bed 10 is a column 14 carrying a saddle 16 in vertical reciprocation thereon in which saddle 16 is transversely reciprocable the wheel head 18 that includes abrasive wheel 20.

Table 12 is adapted for reciprocation on bed 10 by means of a fluid motor consisting of a cylinder 22 and a double acting ram 24 extending therein. Cylinder 22 is stationarily mounted in bed 10 and the rod of ram 24 is attached by bracket member 26 to table 12. This arrangement provides that reversible energization of the fluid motor will cause reciprocation of the table 12 on the bed 10. Suitable controls for limiting the amount of reciprocation of the table on the bed are provided but are not shown in this application for the sake of simplicity.

As will be seen in FIGURES 2 and 3, the table 12 is guided on bed 10 as by the guideways 28 adjacent opposite sides of the table. This guides the table so that it moves in a straight line on the bed. This is availed of in the practice of the present invention by attaching to the table a feed bar 30 which extends in a direction exactly parallel with the direction of travel of the table. On each side of bar 30, preferably in about the middle of bed 10, are located the clamping elements of the present invention. By locating these clamping elements at about the middle of the bed 10 they are available for controlling the feed of the table in any position of the table on the bed.

Each of these clamping elements consist of a rod 32 slidably supported in a block 34 and having at the clamp end an electromagnet 36. This electromagnet is illustrated in FIGURE 4 wherein it will be seen to comprise a core 38 and a coil 40. By forming the feed bar 30 of magnetic material, an extremely strong clamping action of the electromagnet on the feed bar can be obtained by energization of the coil 40.

Each block 34 is slidable toward and away from feed bar 30 by being mounted in a slot 42 in bed 10. The block 34 is firmly supported in the slot so that there is no play between the block and the slot and likewise the rod 32 has a close fit in a bore provided therefore in block 34 so that there is no play of the rod in the block. Thus, when the electromagnet pertaining to either of the clamp members is energized, there is no lost motion that has to be taken up before the clamp member is effective for restraining movement of the table.

The blocks 34 are provided for the purpose of adjusting the amount of free length of each of the rods 32 between the block 34 pertaining thereto and the feed bar so as to control the amount of deflection of the respective rod when it is placed under load by the biasing of the table. If adjustment of the feed increment were not necessary, the blocks 34 could be eliminated and the rods 32 could, instead, be mounted in suitable bores for bushings carried directly by the bed.

The blocks 34 can be made individually adjustable or can be made for simultaneous adjustment by having oppositely threaded portions therein engaged by the oppositely threaded portions 44 and 46 of a control rod 48 extending out the bed, preferably at the back, and which is arranged to be rotated by a crank element 48'. Reduction gearing 50 can be provided so a dial plate or the like 52 will give an accurate indication of the settings of the blocks 34 and the yieldability of the rods 32.

In FIGURE 7 the cycle of operation of the invention is diagrammatically indicated. In operation, the moveable slide or table is moved to a certain position and at which point it is desired to commence control of the feed. In this position one or both of the electromagnets 36 are energized and this brings both clamping members into clamping engagement with feed bar 30 and this will hold the table or slide in precisely the desired position.

By maintaining the fluid motor energized, the table is biased in the direction in which it is desired for the table to move. In order to obtain the fine incremental feed of the present invention, one of the electromagnets is then deenergized. This is illustrated in FIGURE 7 wherein, at the top of the view the electromagnet 36 above the bar is deenergized and is thus disengaged in the bar while the electromagnet 36 below the bar is energized and is clamped to the bar. Upon release of the clamping member shown above the bar in FIGURE 7, the constant bias on the fluid motor causes the rod 32 pertaining to the electromagnet shown beneath the bar in FIGURE 7 to deflect. By suitably adjusting the support block 34, this deflection can be caused to be any desired small amount. It will be understood that the size of the bar and the bias exerted by the fluid motor on the table are all factors in the exact amount of the incremental feed and that ordinary designing skill will be sufficient to determine exactly what the amount of the incremental feed will be.

When another incremental feed is desired, electromagnet 36 above the bar is energized to clamp against the feed bar and the electromagnet shown on the lower side of the bar is deenergized whereupon another increment of feed will occur which will, as before, be determined by the amount of deflection of the free length of the rod 32 pertaining to the now energized electromagnet. The arrangement thus provides a simple device for obtaining the desired incremental feed and with there being provided means for adjusting the size of the feed increments.

In the modification described above, a fluid motor has been employed for actuating the table or slide but it will be evident that this member could be operated by a nut and screw if desired. Such an arrangement as shown in FIGURE 8 wherein the slide or table 51 carries a nut 53 engaged by a screw 54 that has one end fixedly journalled at 56 in bed 58 while the other end is splined to a rotatable support at 60 so that longitudinal movement of the splined end of the screw can take place so as not to interfere with incremental feed movements of the table or slide.

In the previously described modification, a rod is arranged to deflect laterally in order to control the incremental feeding of the table or slide. However, it is also possible to avail of the resilience of a rod or the like in torsion to effect the same sort of control and such a modification is illustrated in FIGURES 9 through 12.

In these figures the bed of the machine is at 70 and the moveable table or slide at 72. The table or slide carries a feed bar 74, as in the previous modification, but the clamp members are in the form of arms 76.

Reciprocably mounted in arm 76 are rods 78 comprising clamping shoe portions 80 at their inner ends, with their being electromagnet means 82 for urging the rods inwardly toward the feed bar to bring the end portions 80 thereof into clamping engagement with the feed bar 74.

Each arm 76 is mounted at its end opposite the feed bar 74 on a vertically extending torque rod 84 which has its upper end pivotally supported in a block 86 and which has its lower end splined and extending through a splined block 88 that is adjustable vertically in the bed by means of the slots 90 and clamping bolts 92. The arrangement of FIGURES 9 through 12 provides for adjustment of the incremental feed of the feed bar 74 by virtue of changing the length of the torque rods 84 between the rigid arms 76 and the rigid clamp blocks 88.

The torque rods can be made of any desired size or any desired length and thus a great variation in the amount of the incremental feed can be had. As before, energization of both of the solenoids will hold the table firmly in place whereas alternate energization and deenergization of the electromagnets will bring about incremental feeding of the table while the table is biased by a suitable motor means such as an electric or fluid motor.

In any case, the present invention provides a simple reliable and easily controlled arrangement for obtaining extremely fine incremental feeds for the purpose of accomplishing extremely fine machining operations or the like. It will be evident that the invention is not limited to the precise incremental feeding of a movable work member of a machine tool but it would also be useful in connection with other members which might be desired to position and feed in this manner.

It will further be evident that the invention is not limited to the control of the reciprocation of the work table of a grinding machine but it could also be employed for controlling the movement of any other part of a machine.

It will be understood that this invention is susceptible to modification in order to adapt it to different usages and conditions, and accordingly, it is desired to comprehend such modifications within this invention as may fall within the scope of the appended claims.

I claim:

1. In a feed control for controlling the relative feeding movement between a tool support member and a work support member in a machine tool; a pair of clamp elements carried in operative relation to said members and each clamp element being operable when actuated to clamp said members together, motor means connected between said members operable to bias the members for relative movement in the feed direction, a clamp rail attached to one of said members and extending thereon in the said feed direction, said clamp elements being supported on the other of said members and each comprising a clamp shoe thereon spaced from the point of support of the respective clamp element and positioned closely adjacent said rail, said rail being magnetic and each said clamp shoe comprising electromagnet means so that upon energization of the electromagnet means the pertaining clamp shoe will be clamped to said rail while deenergization of the electromagnet means will release the pertaining clamp shoe from the rail, each said clamp element including yieldable means yieldable under the thrust of said motor means to permit movement of the pertaining clamp shoe in the said feed direction, and means for first deenergizing and then energizing said electromagnet means alternately while said members are biased by said motor means to obtain successive increments of feed of said members.

2. In a feed control for controlling the relative feeding movement between a tool support member and a work support member in a machine tool; a pair of clamp elements carried in operative relation to said members and each clamp element being operable when actuated to clamp said members together, motor means connected between said members operable to bias the members for relative movement in the feed direction, a clamp rail attached to one of said members and extending thereon in the said feed direction, said clamp elements being supported on the other of said members and each comprising a clamp shoe thereon spaced from the point of support of the respective clamp element and positioned closely adjacent said rail, said rail being magnetic and each said clamp shoe comprising electromagnet means so that upon energization of the electromagnet means the pertaining clamp shoe will be clamped to said rail while deenergization of the electromagnet means will release the pertaining clamp shoe from the rail, each said clamp element including yieldable means yieldable under the thrust of said motor means to permit movement of the pertaining clamp shoe in the said feed direction, and means for first deenergizing and then energizing said electromagnet means alternately while said members are biased by said motor means to obtain successive increments of feed of said members, each clamp element comprising rod means extending from the clamp shoe pertaining thereto away from said rail at substantially right angles thereto, and a bore in the said other member receiving said rod means for effecting the support of the clamp element, said rod means constituting the said yieldable means.

3. In a feed control for controlling the relative feeding movement between a tool support member and a work support member in a machine tool; a pair of clamp elements carried in operative relation to said members and each clamp element being operable when actuated to clamp said members together, motor means connected between said members operable to bias the members for relative movement in the feed direction, a clamp rail attached to one of said members and extending thereon in the said feed direction, said clamp elements being supported on the other of said members and each comprising a clamp shoe thereon spaced from the point of support of the respective clamp element and positioned closely adjacent said rail, said rail being magnetic and each said clamp shoe comprising electromagnet means so that upon energization of the electromagnet means the pertaining clamp shoe will be clamped to said rail while deenergization of the electromagnet means will release the pertaining clamp shoe from the rail, each said clamp element including yieldable means yieldable under the thrust of said motor means to permit movement of the pertaining clamp shoe in the said feed direction, and means for first deenergizing and then energizing said electromagnet means alternately while said members are biased by said motor means to obtain successive increments of feed of said members, each clamp element comprising rod means extending from the clamp shoe pertaining thereto away from said rail at substantially right angles thereto, and a bore in the said other member receiving said rod means for effecting the pertaining support of the clamp element, said rod means constituting the said yieldable means, said other member having support blocks adjustably carried thereby for movement toward and away from said rail and comprising the said bore whereby the length of rod means between the bores and the clamp shoes can be varied thereby to vary the resilience of the rod means in said feed direction thereby to vary the size of the said increments of feed, there being means for adjusting said blocks toward and away from each other, and means for indicating the positions of said blocks relative to said rail.

4. In a feed control for controlling the relative feeding movement between a tool support member and a work support member in a machine tool, motor means connected between said members operable to bias the members for relative movement in the feed direction, a rail on one of said members extending in said feed direction, a pair of clamp elements carried by the other member having clamp shoes adjacent the rail, electrical means pertaining to each shoe energizable for causing the pertaining shoe to clamp against said rail, an arm supporting each shoe, a rod extending substantially perpendicular to the length of said arm and also to the direction of said feed movement supporting said arm, and means on said other member spaced from said arm nonrotatably connected with said rod whereby when the pertaining clamp shoe is clamped to said rail and said members are biased by said motor means in the feed direction, said rod will yield in torsion and provide an increment of feed between said members, and means for first deenergizing and then again energizing said electrical means alternately.

5. In a feed control for controlling the relative feeding movement between a tool support member and a work support member in a machine tool; motor means connected between said members operable to bias the members for relative movement in the feed direction, a rail on one of said members extending in said feed direction, a pair of clamp elements carried by the other member having clamp shoes adjacent the rail, electrical means pertaining to each shoe energizable for causing the pertaining shoe to clamp against said rail, an arm supporting each shoe, a rod extending substantially perpendicular to the length of said arm and also to the direction of said feed movement supporting said arm, and means on said other member spaced from said arm nonrotatably connected with said rod whereby when the pertaining clamp shoe is clamped to said rail and said members are biased by said motor means in the feed direction, said rod will yield in torsion and provide an increment of feed between said members, and means for first deenergizing and then again energizing said electrical means alternately, said other member comprising journal means supporting each rod adjacent its connection with said arm, and the means nonrotatably connected with said rod being adjustable on said other member in the direction of the length of said rod whereby to control the amount of deflection of each rod when placed in torsion.

6. In a feed control for controlling the relative feeding movement between a tool support member and a work support member in a machine tool; a pair of clamp elements carried in operative relation to said members and each clamp element being operable when actuated to clamp said members together, motor means connected between said members operable to bias the members for relative movement in the feed direction, a clamp rail attached to one of said members and extending thereon in the said feed direction, said clamp elements being supported on the other of said members and each comprising a clamp shoe thereon spaced from the point of support of the respective clamp element and positioned closely adjacent said rail, said rail being magnetic and each said clamp shoe comprising electromagnet means so that upon energizaton of the electromagnet means the pertaining clamp shoe will be clamped to said rail while deenergization of the electromagnet means will release the pertaining clamp shoe from the rail, and means for first de-energizing and then energizing said electromagnet means alternately while said members are biased by said motor means to obtain successive increments of feed of said members, each clamp element comprising rod means extending from the clamp shoe pertaining thereto away from said rail at substantially right angles thereto, and a bore in the said other member receiving said rod means for effecting the support of the clamp element, said other member having support blocks adjustably carried thereby for movement toward and away from said rail and comprising the said bore whereby the length of the rod means between the bores and the clamp shoes can be varied thereby to vary the resilience of the rod means in said feed direction thereby to vary the size of the said increments of feed, said motor means developing sufficient thrust to cause yielding of said rod means.

7. In a feed control for controlling the relative feeding movement between a tool support member and a work support member in a machine tool; said members being guided for relative movement in a pre-determined feed directon, a clamp element carried by one of said members and selectively engageable with the other member, means for causing said clamp element to clampingly engage said other member, said clamp element including yieldable means between said members yieldable in the said feed direction and motor means connected between said member for exerting a bias on said members urging said members relatively in the feed direction while said other member is engaged by said clamp element, said motor means developing a thrust sufficient to cause yielding of said yieldable means whereby to obtain an increment of feed of said other member which is dependent upon the degree of the bias exerted by said motor means on said members and the degree of resilience of said yieldable means.

8. In a feed control for controlling the relative feeding movement between a tool support member and a work support member in a machine tool; a pair of clamp elements carried in operative relation to said members and each clamp element being operable when energized to clamp said members together, motor means connected between said members operable for moving the members relatively in a feed direction, each said clamp element being supported on one of said members and clampingly engaging the other thereof when energized, each clamp element including yieldable means yieldable in the direction of feed of one of said members, said motor means being operable to bias said members relatively in the feed direction with a thrust sufficient to cause yielding of said yieldable means while said clamp elements are energized, and means operable for selectively energizing and de-energizing said clamp elements alternately to obtain incremental relative feeding of said members which is depedent upon the degree of bias exterted on said members and the degree of resilience of said yieldable means.

9. In a feed control for controlling the relative feeding movement between a tool support member and a work support member in a machine tool; a pair of clamp elements carried in operative relation to said members and each clamp element being operable when actuated to clamp said members together, motor means connected between said members operable to bias the members for movement relatively in a feed direction, each said clamp element being supported on one of said members and having a clamp shoe adjacent the other member, each clamp shoe comprising electrical means energizable for moving the clamp shoe into clamping relation with said other member, each clamp element including yieldable means yieldable under the bias of said motor means to permit movement of the clamp shoes in the said feed direction, means for energizing said electrical means to cause said clamp shoes to clampingly engage said other member, and means operable while said motor means is exerting a bias on said members to move them relatively in the feed direction for first de-energizing and then again energizing said electrical means alternately to obtain successive increments of feed of said members which are dependent upon the magnitude of the bias developed by said motor means and the degree of resilience of said yieldable means.

10. In a feed control for controlling the relative feeding movement between a tool support member and a work support member in a machine tool; a pair of clamp elements carried in operative relation to said members and each clamp element being operable when actuated to clamp said members together, motor means connected between said members operable to bias the members for movement relatively in a feed direction, each said clamp element being supported on one of said members and having a clamp shoe thereon spaced from the point of support of the respective clamp element, a clamp rail on the other of said members extending parallel to said feed direction and adjacent said shoes, electrical means pertaining to each clamp shoe selectively energizable for clamping the pertaining shoe to said rail and de-energizable to release the said pertaining shoe from the rail, and each clamp element including yieldable means yieldable under the bias of said motor means and operable to permit movement of the clamp shoe pertaining thereto in the said feed direction.

11. In a fine feed control for a grinding machine; a first member for supporting a workpiece, a second member supporting a grinding wheel, said members being guided for movement relatively in a predetermined feed direction, motor means connected between the members for biasing the members relatively in the feed direction, at least two clamp means operatively associated with said members selectively actuatable for clamping the members together and resiliently yieldable under the thrust of said motor means and in the said feed direction whereupon the relative feed of the members when biased by said motor means will be controlled by the yieldability of said clamp means, and means for alternately actuating said clamp means out of and then again into clamping relation with said members while the members are biased by said motor means thereby to obtain successive increments of feed.

12. A method of obtaining fine increments of feed between two members relatively movable in a predetermined feed direction which comprises; biasing the members for relative movement in the said feed direction, resiliently restraining relative movement in the feed direction, and momentarily reducing to zero the degree to which said members are resiliently restrained to obtain an increment of feed movement of said members relatively.

13. A method of obtaining fine increments of feed between two members relatively movable in a predetermined feed direction which comprises; biasing the members for relative movement in the said feed direction, resiliently restraining relative movement of said members in the feed direction, and repeatedly momentarily reducing to zero the degree to which said members are resiliently restrained to obtain a plurality of increments of feed movement of said members relatively in succession.

References Cited in the file of this patent

UNITED STATES PATENTS

| | | |
|---|---|---|
| 2,506,141 | Drouin | May 2, 1950 |
| 2,926,467 | Krause et al. | Mar. 1, 1960 |
| 3,031,805 | Snyder | May 1, 1962 |